United States Patent
Kocharlakota

(10) Patent No.: US 10,067,656 B2
(45) Date of Patent: Sep. 4, 2018

(54) METHOD AND APPARATUS FOR CONTEXT BASED APPLICATION GROUPING IN VIRTUAL REALITY

(71) Applicant: Samsung Electronics Co., Ltd., Suwon-si, Gyeonggi-do (KR)

(72) Inventor: Sridhar Kocharlakota, Cupertino, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 234 days.

(21) Appl. No.: 14/789,634

(22) Filed: Jul. 1, 2015

(65) Prior Publication Data

US 2017/0003858 A1    Jan. 5, 2017

(51) Int. Cl.
| | |
|---|---|
| *G06F 3/048* | (2013.01) |
| *G06F 3/0484* | (2013.01) |
| *H04L 12/18* | (2006.01) |
| *G06F 9/451* | (2018.01) |
| *G06F 9/44* | (2018.01) |
| *G06F 3/01* | (2006.01) |
| *G06F 3/0482* | (2013.01) |

(52) U.S. Cl.
CPC .......... *G06F 3/04842* (2013.01); *G06F 3/011* (2013.01); *G06F 3/0482* (2013.01); *G06F 9/4443* (2013.01); *G06F 9/451* (2018.02); *H04L 12/1822* (2013.01)

(58) Field of Classification Search
CPC ....... H04L 67/10; H04L 67/22; G06T 19/006; G06T 17/00
See application file for complete search history.

(56) References Cited

U.S. PATENT DOCUMENTS

| | | | |
|---|---|---|---|
| 2007/0101291 A1* | 5/2007 | Forstall ................. | G06F 3/0482 715/805 |
| 2016/0023602 A1* | 1/2016 | Krishnan ................. | B60R 1/00 348/115 |

(Continued)

FOREIGN PATENT DOCUMENTS

WO    2015065402 A1    5/2015

OTHER PUBLICATIONS

European Patent Office, "European Search Report," Application No. 16172996.7-1959, dated Nov. 11, 2016, 9 pages, publisher EPO, Munich, Germany, place of search The Hague.

(Continued)

*Primary Examiner* — Jeffrey A Gaffin
*Assistant Examiner* — Ayesha Huertas Torres

(57) ABSTRACT

A method and apparatus are provided for application selection in virtual reality mode. The method includes receiving a selection of an application. The method also includes determining whether a display of a user equipment is in the virtual reality mode. The method also includes, responsive to the user equipment being in the virtual reality mode, determining whether the selected application is included in a grouping of applications. The grouping includes one or more applications related to the selected application. The method also includes, responsive to the selected application being included in a grouping of applications, executing the grouping of applications. The method also includes providing the executed grouping of applications to the display.

21 Claims, 4 Drawing Sheets

(56) References Cited

U.S. PATENT DOCUMENTS

2016/0253067 A1* 9/2016 Webb .................... G06F 3/0482
463/31
2016/0269540 A1* 9/2016 Butcher ............ H04M 1/72569

OTHER PUBLICATIONS

Alec Buren, "Crowdfunding campaign launched for the 30 printed virtual reality headset Pin," XP055315137, Nov. 27, 2014, 9 pages, available at www.3ders.org/articles/20141127.
European Patent Office Communication regarding Application No. 16172996.7, dated Jan. 24, 2018, 7 pages.

* cited by examiner

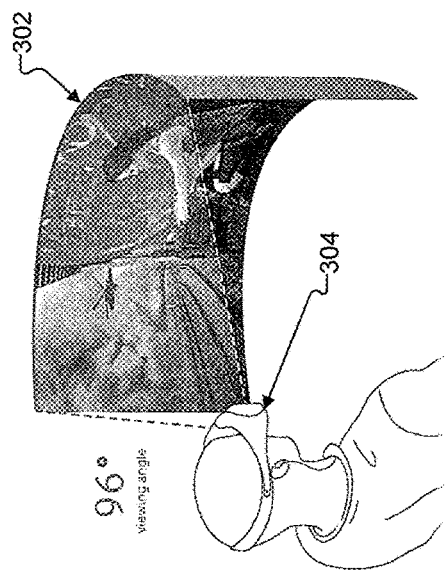
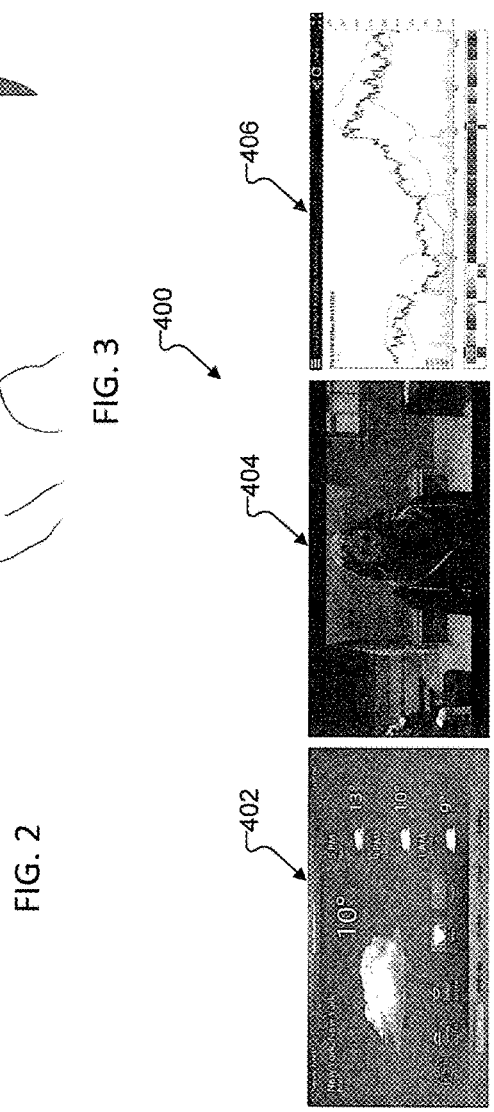

METHOD AND APPARATUS FOR CONTEXT BASED APPLICATION GROUPING IN VIRTUAL REALITY

TECHNICAL FIELD

This disclosure relates generally to head-mountable displays (HMDs). More specifically, this disclosure relates to a three-dimensional (3D) user interface (UI) for a HMD.

BACKGROUND

Although HMD technology has long been in development and wearable technology products are increasingly visible, there is a lack of specialized UI framework for HMD for both virtual reality (VR) and augmented reality (AR) applications. Current HMD technology focuses on the implementation and treatment of the main content display, and the attention to the UI has been minimal.

SUMMARY

A method is provided for application selection in virtual reality mode. The method includes receiving a selection of an application. The method also includes determining whether a display of a user equipment is in the virtual reality mode. The method also includes, responsive to the user equipment being in the virtual reality mode, determining whether the selected application is included in a grouping of applications. The grouping includes one or more applications related to the selected application. The method also includes, responsive to the selected application being included in a grouping of applications, executing the grouping of applications. The method also includes providing the executed grouping of applications to the display.

An apparatus is provided for application selection in virtual reality mode. The apparatus includes a memory element, a display, and processing circuitry. The memory element is configured to store a grouping of applications. The display is configured to display the grouping of applications. The processing circuitry is configured to receive a selection of an application. The processing circuitry is also configured to determine whether the user equipment is in the virtual reality mode. The processing circuitry is also configured to, responsive to the user equipment being in the virtual reality mode, determine whether the selected application is included in the grouping of applications. The grouping includes one or more applications related to the selected application. The processing circuitry is also configured to, responsive to the selected application being included in a grouping of applications, execute the grouping of applications. The processing circuitry is also configured to provide the executed grouping of applications to a display of the user equipment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The teen "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer-readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates an example HMD according to an embodiment of this disclosure;

FIG. 3 illustrates an example view in an HMD according to an embodiment of this disclosure;

FIG. 4 illustrates a multiple window view according to an embodiment of this disclosure;

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Figure 1:
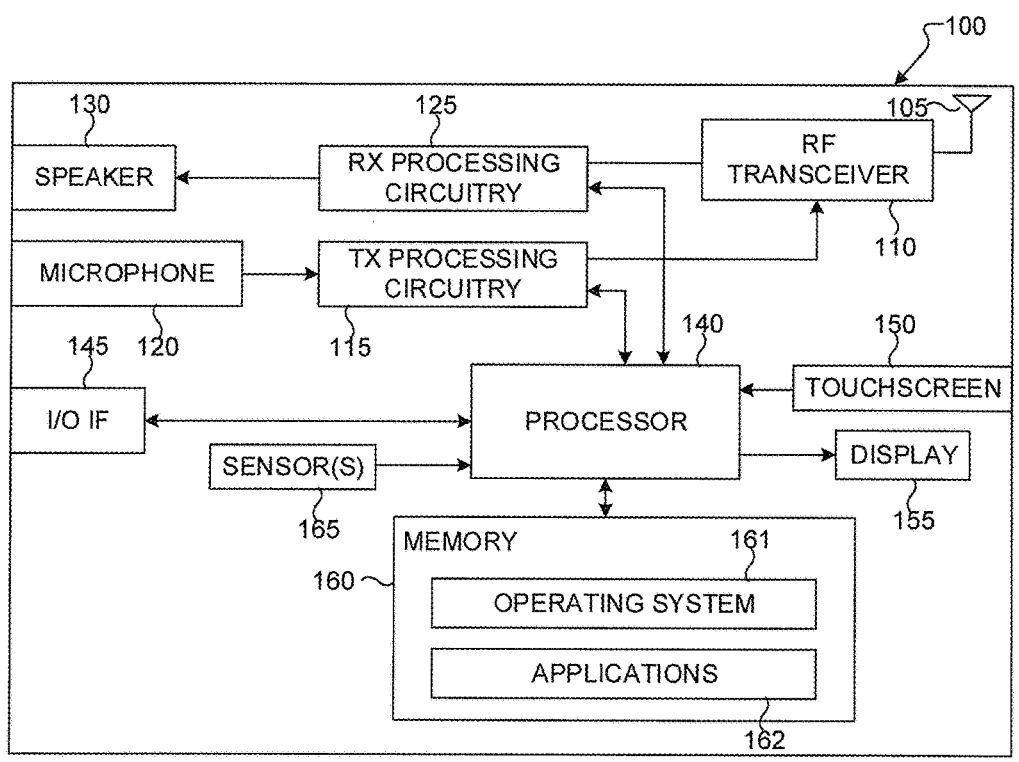
FIG. 1 illustrates an example HMD according to embodiments of the present disclosure and in which embodiments of the present disclosure may be implemented.

FIG. 1 illustrates an example HMD 100 according to embodiments of the present disclosure and in which embodiments of the present disclosure may be implemented. The embodiment of the HMD 100 illustrated in FIG. 1 is for illustration only, the HMD 100 comes in a wide variety of configurations, and FIG. 1 does not limit the scope of this disclosure to any particular implementation of a HMD.

In various embodiments, the HMD 100 may take different forms, and the present disclosure is not limited to any particular form. For example, the HMD 100 may be a mobile communication device, such as, for example, mobile device, a user equipment, a mobile station, a subscriber station, a wireless terminal, a smart phone, a tablet, etc., that is mountable within a headset for VR and/or AR applications. In other examples, the HMD 100 may include the headset and take the form of a wearable electronic device, such as, for example, glasses, goggles, a helmet, etc., for the VR and/or AR applications.

As shown in FIG. 1, the HMD 100 includes an antenna 105, a radio frequency (RF) transceiver 110, transmit (TX) processing circuitry 115, a microphone 120, and receive (RX) processing circuitry 125. The HMD 100 also includes a speaker 130, a processor 140, an input/output (I/O) interface (IF) 145, a touchscreen 150, a display 155, a memory 160, and one or more sensors 165. The memory 160 includes an operating system (OS) 161 and one or more applications 162.

The RF transceiver 110 receives, from the antenna 105, an incoming RF signal transmitted by an access point (e.g., base station, WiFi router, Bluetooth device) for a network (e.g., a WiFi, Bluetooth, cellular, 5G, LTE, LTE-A, WiMAX, or any other type of wireless network). The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the processor 140 for further processing (such as for web browsing data).

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105.

The processor 140 can include one or more processors or other processing devices and execute the OS 161 stored in the memory 160 in order to control the overall operation of the HMD 100. For example, the processor 140 could control the reception of forward channel signals and the transmission of reverse channel signals by the RF transceiver 110, the RX processing circuitry 125, and the TX processing circuitry 115 in accordance with well-known principles. In some embodiments, the processor 140 includes at least one microprocessor or microcontroller.

The processor 140 is also capable of executing other processes and programs resident in the memory 160. The processor 140 can move data into or out of the memory 160 as required by an executing process. In some embodiments, the processor 140 is configured to execute the applications 162 based on the OS 161 or in response to signals received from eNBs or an operator. The processor 140 is also coupled to the I/O interface 145, which provides the HMD 100 with the ability to connect to other devices, such as laptop computers and handheld computers. The I/O interface 145 is the communication path between these accessories and the processor 140.

The processor 140 is also coupled to the touchscreen 150 and the display 155. The operator of the HMD 100 can use the touchscreen 150 to enter data and/or inputs into the HMD 100. The display 155 may be a liquid crystal display, light-emitting diode (LED) display, optical LED (OLED), active matrix OLED (AMOLED), or other display capable of rendering text and/or graphics, such as from web sites, videos, games, etc.

The memory 160 is coupled to the processor 140. Part of the memory 160 could include a random access memory (RAM), and another part of the memory 160 could include a Flash memory or other read-only memory (ROM).

HMD 100 further includes one or more sensors 165 that can meter a physical quantity or detect an activation state of the HMD 100 and convert metered or detected information into an electrical signal. For example, sensor 165 may include one or more buttons for touch input, e.g., on the headset or the HMD 100, a camera, a gesture sensor, a gyroscope or gyro sensor, an air pressure sensor, a magnetic sensor or magnetometer, an acceleration sensor or accelerometer, a grip sensor, a proximity sensor, a color sensor 165H (e.g., a Red Green Blue (RGB) sensor), a bio-physical sensor, a temperature/humidity sensor, an illumination sensor 165K, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 165 can further include a control circuit for controlling at least one of the sensors included therein. As will be discussed in greater detail below, one or more of these sensor(s) 165 may be used to control a UI, detect UI inputs, determine the orientation and facing direction of the user for 3D content display identification, etc. Any of these sensor(s) 165 may be located within the HMD 100, within a headset configured to hold the HMD 100, or in both the headset and HMD 100, for example, in embodiments where the HMD 100 includes a headset.

The touchscreen 150 can include a touch panel, a (digital) pen sensor, a key, or an ultrasonic input device. The touchscreen 150 can recognize, for example, a touch input in at least one scheme among a capacitive scheme, a pressure sensitive scheme, an infrared scheme, or an ultrasonic scheme. The touchscreen 150 can also include a control circuit. In the capacitive scheme, the touchscreen 150 can recognize touch or proximity.

As described in more detail below, the HMD 100 may include circuitry for and applications for providing a 3D UI for a HMD. Although FIG. 1 illustrates one example of HMD 100, various changes may be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). Also, while FIG. 1 illustrates the HMD 100 configured as a mobile telephone, tablet, or smartphone, the HMD 100 could be configured to operate as other types of mobile or stationary devices.

FIG. 2 illustrates an example HMD 200 according to an embodiment of this disclosure. HMD 200 can be one example of one configuration of HMD 100 as show in FIG. 1. As illustrated, only one side of HMD 200 is shown.

FIG. 3 illustrates an example view 302 in an HMD 304 according to an embodiment of this disclosure. In FIG. 3, a user is wearing the HMD 304 and is seeing the view 302. The view 302 includes a ninety-six degree viewing angle. In different embodiments, other viewing angles can be used.

Various embodiments of this disclosure recognize and take into account that HMD 304 with mega sized screens and ninety-six degree viewing angles allow users to feel the world beyond peripheral vision. There are applications on the HMD 304 with a mobile device LCD as the screen. Users might want to use a mobile device without removing the HMD 304. The user may desire to seamlessly switch between the VR world and the real world. In an example, a user is watching a movie in HMD 304 and wants to write an email. In this example, the user can draft the email in the VR environment without removing the HMD 304. The mobile device can display the mobile device environment in the VR world.

FIG. 4 illustrates a multiple window view 400 according to an embodiment of this disclosure. In FIG. 4, the view 400 includes multiple windows 402-406. Various embodiments of this disclosure recognize and take into account that it is difficult to efficiently use multiple windows launched in a VR environment. Various embodiments of this disclosure provide multiple screens as part of the VR environment. Window 402 is the weather, window 404 is a video, and window 406 is the stock value of a company. All the three applications in the windows 402-406 are from the mobile device mounted on the HMD. The applications launched or executed in each of the windows 402-406 can be based on the user context and/or a grouping. Related applications are launched on multiple windows 402-406.

In various embodiments, the grouping of applications can be predefined, dynamically set based on usage patterns, set by location, set by time, or a combination thereof. The usage patterns can be obtained from data in the memory element of the user equipment or a network server.

Figure 5:
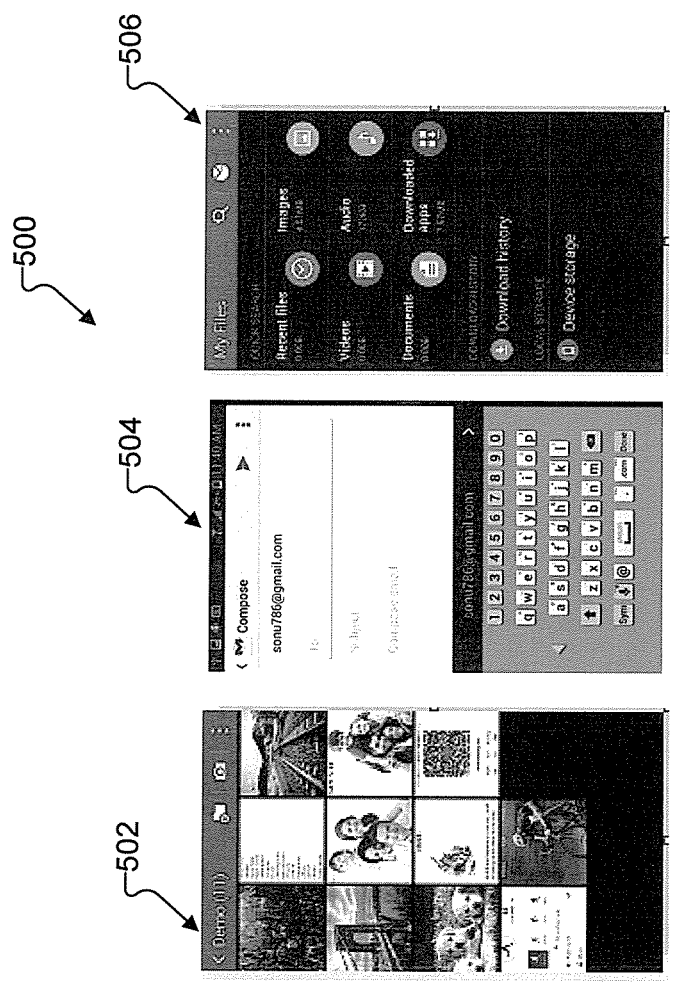
FIG. 5 illustrates a grouping of applications according to an embodiment of this disclosure.

FIG. 5 illustrates a grouping 500 of applications according to an embodiment of this disclosure. In FIG. 5, a photo application 502, an email application 504, and a document storage application 506 are part of grouping 500.

In one example embodiment, if a user is composing an email and wants to attach a picture and document to this email, the user may need to access three applications to attach the picture and document. The three applications can be an email application 502, a photo application 504, and a document storage application 506. In this example, the email application 502 is the primary application where as photo application 504 and document storage application 506 are the related applications from where the user selects content to copy or insert into the primary application. When the user selects the email application 502 for execution, the photo application 504 and the document storage application 506 are automatically launched.

Figure 6:
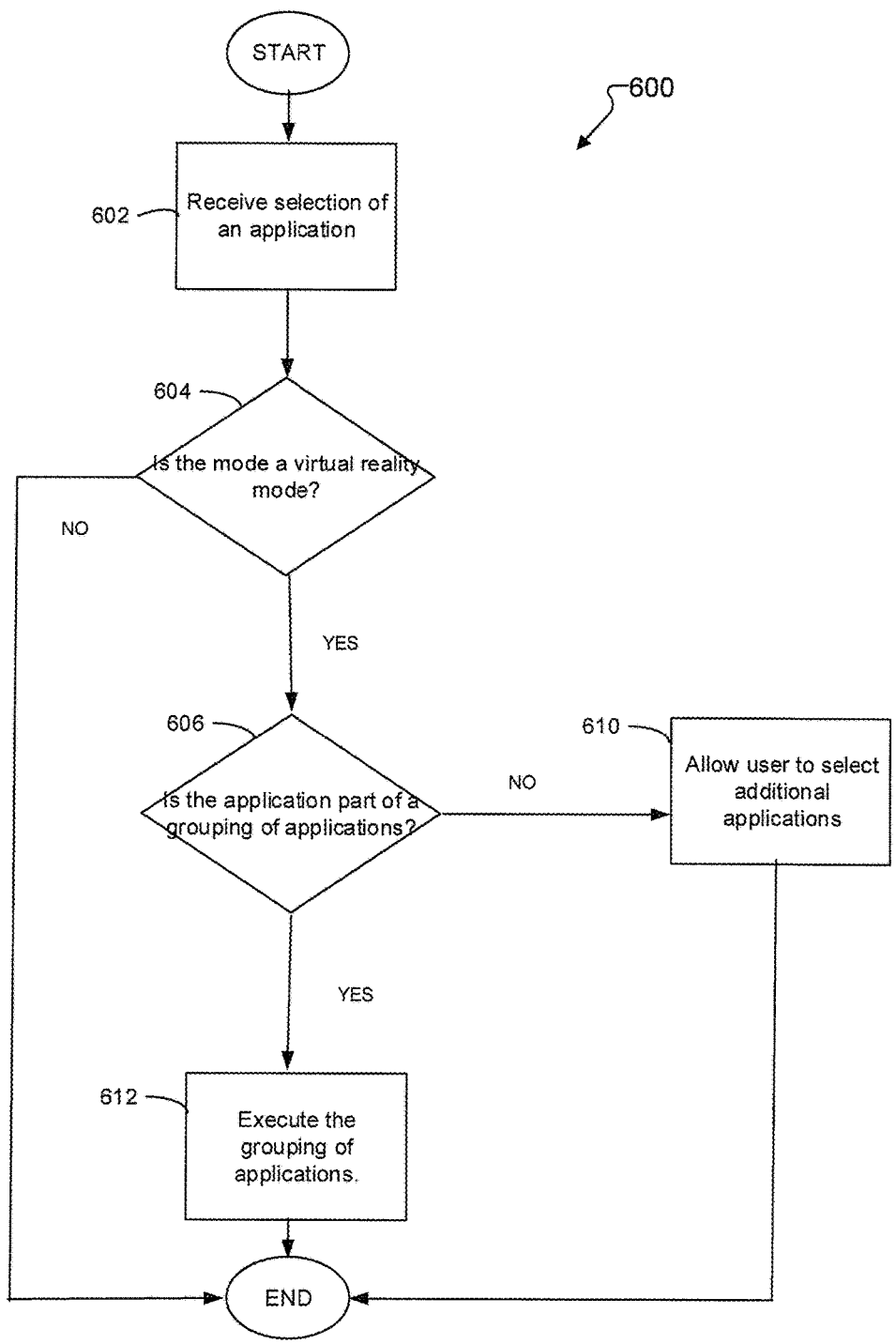
FIG. 6 illustrates a process for application selection in virtual reality mode according to an embodiment of this disclosure.

FIG. 6 illustrates a process 600 for application selection in virtual reality mode according to an embodiment of this disclosure. In FIG. 6, virtual reality mode can be defined as a mode where a HMD is used for virtual reality or augmented reality. In certain embodiments, the viewing angle of an HMD or user equipment such that multiple applications can be viewed at the same time. Process 600 can be performed by one or more components of FIG. 1, such as a controller, processor, and/or processing circuitry.

At operation 602, a processor receives a selection of an application. The selection may be made by user input and the processor may receive the selection from a user input device, such as a touch screen.

At operation 604, the processor determines whether the mode of the operating system of the user equipment is a virtual reality mode. If the mode is not a virtual reality mode, the process 600 ends and the application may execute in a normal manner. If the mode is a virtual reality mode, at operation 606, the processor determines whether the application is part of a grouping of applications. The grouping of applications can be predefined, dynamic, or based on location and time. In different embodiments, some groupings can be predefined, while other groupings may be dynamic or based on location and time.

If the application is not a part of the grouping of applications, at operation 610, the processor allows a user to select additional applications for viewing with the selected application. Due to the viewing angle of the user equipment in virtual reality mode, the selected application and the additional applications can all be viewed at the same time. If the application is part of the grouping of applications, at operation 612, the processor executes the grouping of applications and provides the grouping to a display of the user equipment.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for application selection in a virtual reality mode, the method comprising:
   receiving, by a mobile device disposed in an head mounted display, a selection of an application, the mobile device configured to operate in the virtual reality mode and a non-virtual reality mode, the virtual reality mode configured to display three-dimensional content;
   determining whether the mobile device is operating in the virtual reality mode;
   determining, in response to the mobile device operating in the virtual reality mode, whether the selected application is included in a grouping of applications, wherein the grouping includes one or more applications related to the selected application;
   responsive to the selected application being included in a grouping of applications, executing the grouping of applications; and
   providing the executed grouping of applications to a display of the mobile device.

2. The method of claim 1, wherein the one or more applications of the grouping of applications are adjacent in the display.

3. The method of claim 1, wherein the grouping is predefined.

4. The method of claim 1, wherein the grouping is dynamically set based on usage patterns.

5. The method of claim 1, wherein the grouping is dynamically set based on a location of the mobile device.

6. The method of claim 1, wherein the grouping is dynamically set based on a time.

7. The method of claim 4, wherein the usage patterns are obtained from usage data in a network server.

8. The method of claim 4, wherein the usage patterns are obtained from usage data in a memory element of the mobile device.

9. The method of claim 1, wherein the grouping is set by a user.

10. The method of claim 1, wherein content in one application in the grouping is copied to another application in the grouping.

11. A mobile device, the mobile device comprising:
a memory element configured to store a grouping of applications;
a display configured to display the grouping of applications in a virtual reality mode and a non-virtual reality mode, the virtual reality mode configured to display three-dimensional content; and
processing circuitry coupled to the memory element and display, the processing circuitry configured to:
receive selection of an application;
determine whether the mobile device is operating in the virtual reality mode;
determine, in response to the mobile device operating in the virtual reality mode, whether the selected application is included in the grouping of applications, wherein the grouping includes one or more applications related to the selected application;
responsive to the selected application being included in a grouping of applications, execute the grouping of applications; and
provide the executed grouping of applications to the display.

12. The mobile device of claim 11, wherein the one or more applications of the grouping of applications are adjacent in the display.

13. The mobile device of claim 11, wherein the grouping is predefined.

14. The mobile device of claim 11, wherein the grouping is dynamically set based on usage patterns.

15. The mobile device of claim 11, wherein the grouping is dynamically set based on a location of the mobile device.

16. The mobile device of claim 11, wherein the grouping is dynamically set based on a time.

17. The mobile device of claim 14, wherein the usage patterns are obtained from usage data in a network server.

18. The mobile device of claim 14, wherein the usage patterns are obtained from usage data in a memory element of the mobile device.

19. The mobile device of claim 11, wherein the grouping is set by a user.

20. The mobile device of claim 11, wherein content in one application in the grouping is copied to another application in the grouping.

21. The method of claim 1, further comprising:
responsive to the selected application not being included in the grouping of the applications, allowing a user to select an additional application for viewing with the selected application as the grouping of the applications.

* * * * *